(12) United States Patent
Welton et al.

(10) Patent No.: US 7,299,877 B2
(45) Date of Patent: Nov. 27, 2007

(54) METHODS FOR EFFECTING CONTROLLED BREAK IN PH DEPENDENT FOAMED FRACTURING FLUID

(75) Inventors: Thomas D. Welton, Duncan, OK (US); Bradley L. Todd, Duncan, OK (US); David McMechan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 158 days.

(21) Appl. No.: 11/199,921

(22) Filed: Aug. 9, 2005

(65) Prior Publication Data

US 2007/0034378 A1 Feb. 15, 2007

(51) Int. Cl.
*E21B 43/26* (2006.01)
(52) U.S. Cl. ............... 166/308.6; 166/308.2
(58) Field of Classification Search ........... None
See application file for complete search history.

(56) References Cited

U.S. PATENT DOCUMENTS

| | | | |
|---|---|---|---|
| 6,454,008 B1 | 9/2002 | Chatterji et al. ........... 166/308 |
| 6,858,743 B2 | 2/2005 | Stanek et al. ........... 549/307 |
| 6,966,379 B2 * | 11/2005 | Chatterji et al. ........ 166/308.6 |
| 7,140,438 B2 * | 11/2006 | Frost et al. ........... 166/278 |
| 2004/0200616 A1 | 10/2004 | Chatterji et al. ........... 166/267 |
| 2005/0043188 A1 | 2/2005 | Chatterji et al. ........... 507/100 |
| 2005/0077047 A1 | 4/2005 | Chatterji et al. ........... 166/300 |

\* cited by examiner

*Primary Examiner*—Jennifer H. Gay
*Assistant Examiner*—Kerry W. Leonard
(74) *Attorney, Agent, or Firm*—Robert A. Kent; Crutsinger & Booth

(57) ABSTRACT

The invention provides a fluid for use in a subterranean formation penetrated by a wellbore, the fluid comprising: (a) water; (b) an orthoester; and (c) a surfactant comprising a tertiary alkyl amine ethoxylate generally represented by the following formula:

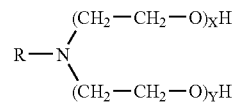

wherein R is an alkyl group or aryl group, and wherein X and Y are each independently at least one. The invention also provides a method of fracturing a subterranean formation, comprising the step of forming a foamed fracturing fluid comprising water; an orthoester; a surfactant comprising a tertiary alkyl amine ethoxylate generally represented by the formula above; and a gas. The method also provides the step of introducing the foamed fracturing fluid into a subterranean formation at a pressure sufficient to create a fracture in the subterranean formation.

15 Claims, No Drawings

METHODS FOR EFFECTING CONTROLLED BREAK IN PH DEPENDENT FOAMED FRACTURING FLUID

CROSS-REFERENCE TO RELATED APPLICATIONS

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

This invention generally relates to recovering hydrocarbons from subterranean formations. More specifically, the invention relates to methods of fracturing a subterranean formation using a fracturing fluid that defoams in response to a change in pH.

BACKGROUND OF THE INVENTION

Hydrocarbon (e.g., oil, natural gas, etc) in a subterranean formation can be recovered by drilling a well into the subterranean formation. Hydrocarbon in the subterranean formation is driven into the well to be produced by, for example, pressure gradients that exist between the formation and the well, the force of gravity, displacement of the fluids using pumps or the force of another fluid injected into the well. The production of hydrocarbon is commonly increased by hydraulically fracturing the subterranean formation. In hydraulic fracturing, a fracturing fluid is pumped into a well at a rate and pressure sufficient to form fractures that extend into the formation, providing additional pathways through which the fluids can flow into the well and be recovered.

The fracturing fluid is frequently a water-based fluid containing a viscosifying agent to increase the viscosity of the fluid. The viscosifying agent is usually a gelling agent. The gelling agent works to reduce the leakage of liquid from the fractures into the subterranean formation. The gelling agent is commonly a polymeric material or surfactant.

In addition, particulate matter known as proppant, e.g., graded sand, bauxite, or resin coated sand, is typically dispersed in a desired portion of the fracturing fluid. Fracturing fluid has been developed for its proppant carrying capacity, fluid loss control, and high viscosity. The proppant is suspended in the fracturing fluid and becomes deposited into the fractures created by the pressure exerted on the fracturing fluid. The presence of the proppant in the fractures holds the fractures open after the pressure has been released. Otherwise, the fractures would close, rendering the fracturing operation less effective and possibly useless. Ideally, the proppant has sufficient compressive strength to resist crushing.

Foamed fracturing fluid is one type of fracturing fluid that has a relatively large volume of gas dispersed in a relatively small volume of liquid. Foamed fracturing fluid also includes a surfactant for facilitating the foaming and stabilization of the foam produced when the gas is mixed with the liquid. The most commonly used gases for foamed fracturing fluids are nitrogen and carbon dioxide because they are non-combustible, readily available, and relatively cheap.

The procedure used to fracture a subterranean formation with foamed fracturing fluid includes pumping the foamed fracturing fluid into a well at a pressure sufficient to fracture the formation.

One type of foamed fracturing fluid has been developed that is advantageously controlled by change of pH. Thus, upon lowering the pH of the pH-dependent foamed fracturing fluid, the foam is broken, or defoamed. Such pH-dependent, foam fracturing fluids are further discussed in Halliburton's U.S. patent application Ser. No. 10/396,606, filed Mar. 25, 2003, entitled "Recyclable Foamed Fracturing Fluids and Methods of Using the Same;" Halliburton's Pub. No. US 2005/0043188, entitled "Recyclable Foamed Fracturing Fluids and Methods of Using the Same"; Halliburton's Pub. No. US 2005/0077047 entitled, "Methods of Fracturing a Subterranean Formation Using a pH Dependent Foamed Fracturing Fluid"; and Halliburton's Pub. No. US 2004/0200616 entitled, "Recyclable Foamed Fracturing Fluids and Methods of Using the Same," all of which are incorporated by reference in their entirety.

A method is needed to defoam the pH-dependent foamed fracturing fluid after the hydraulic fracture treatment is completed.

SUMMARY OF THE INVENTION

The invention provides a fluid for use in a subterranean formation penetrated by a wellbore, the fluid comprising: (a) water; (b) an orthoester; and (c) a surfactant comprising a tertiary alkyl amine ethoxylate generally represented by the following formula:

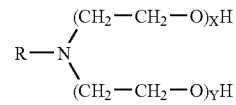

wherein R is an alkyl group or aryl group, and wherein X and Y are each independently at least one.

The invention also provides a method of fracturing a subterranean formation, comprising the step of forming a foamed fracturing fluid comprising water; an orthoester; and a surfactant comprising a tertiary alkyl amine ethoxylate generally represented by the following formula:

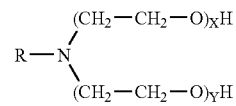

wherein R is an alkyl group or aryl group, and wherein X and Y are each independently at least one; and a gas. The method also provides the step of introducing the foamed fracturing fluid into a subterranean formation at a pressure sufficient to create a fracture in the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF THE PREFERRED EMBODIMENTS

Conventional methods of breaking the pH-dependent foamed fracturing fluid is via pH lowering minerals or formation water, which work to lower the pH of the fracturing fluid. Thus, once a pH-dependent foamed fracturing fluid has been foamed, it is introduced into the subterranean formation, where it undergoes a lowering in pH, for example upon in situ contact with a naturally occurring material in the subterranean formation that is sufficient to cause its pH to change. Once defoamed, the fracturing fluid flows back to the surface with very little or no foam. This method for defoaming the pH-depending foamed fracturing fluid, however, is sometimes ineffective when the formation being fractured has high pH formation water, little to no water production, and/or no pH lowering minerals.

The foamed fracturing fluid of the invention comprises water, a surfactant, and an acid-generating orthoester. The invention also provides a method of defoaming a pH-depending foamed fracturing fluid after the hydraulic fracture treatment is completed. The method for defoaming a pH-depending foamed fracturing fluid is especially advantageous when the formation being fractured has high pH formation water, little to no water production, and/or no pH lowering minerals. In these scenarios, the invention's method of defoaming a pH dependent fracturing fluid is especially advantageous.

A foamed fracturing fluid is herein defined as a fracturing fluid that contains gas dispersed in a liquid. The volume percent of gas that is dispersed in the liquid is referred to as the "quality" of the foam. The gas volumetric fraction or "quality" of useful foamed fracture fluids is typically in the range of from about 60 volume percent to about 8C volume percent gas. However, stable foams with qualities of up to about 95% can be produced. In general, the viscosity of the foamed fluid increases with increasing quality. Proppant also increases the apparent viscosity of foamed fracture fluid. It should be understood that "subterranean formation" encompasses both areas below exposed earth and areas below earth covered by water such as sea or ocean water.

The fracturing fluid is preferably a water-based composition having a balance of water after taking other components of the fracturing fluid into account. The fracturing fluid can contain produced water, fresh water or salt water such as brines and seawater.

According to the invention, the acid-generating orthoester causes a decrease in the pH of the foamed fracturing fluid, which facilitates the defoaming of the foam. The acid-generating orthoester can be any orthoester that is capable of providing a slow release of acid in the fracturing fluid. The acid-generating orthoester decreases the pH of the foamed fracturing fluid to sufficiently convert the foaming surfactant to a predominantly nonfoaming surfactant, whereby the foamed fracturing fluid substantially defoams. The orthoester is preferably selected such that the release of the acid is sufficiently delayed to allow the foamed fracturing fluid to be injected through the wellbore and into the formation before the acid-generating orthoester would be expected to reduce the pH of the foamed fracturing fluid to less than about 8 under the temperature conditions of the formation.

The orthoester compositions of the invention comprise orthoesters. These orthoesters will generate acids that will degrade the foam. Examples of suitable orthoesters have a structure defined by the formula: RC(OR')(OR'')(OR'''), wherein R is a hydrogen, an alkyl group, or an aryl group, wherein R', R'', and R''' are each an alkyl group or an aryl group but not hydrogen, and wherein R', R'', and R''' may or may not be the same group. Any one or more of R, R', R'', and R''' may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates).

Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors. The orthoester may comprise less than about 1% to about 100% of the orthoester composition.

To allow the orthoester to hydrolyze to produce an acid, a source of water is needed, whether from the formation or introduced into the formation. The water should be present in an amount from about 2 moles of water for about every 1 mole of orthoester to an excess of water.

The orthoester compositions of the invention also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions of the invention can have any suitable form. For instance, these compositions can be used in a solution form, a gel form, or an emulsion form. In certain applications, a solution form may be useful, e.g., when a faster break or degradation of the foam, is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

In alternative embodiments of the methods of the invention, an orthoester composition of the invention may be coated or impregnated onto a particulate that will be placed downhole in a subterranean fracturing treatment. When the orthoester ultimately hydrolyzes and generates the acid, the acid may react with the foaming surfactant making it to become predominantly a nonfoaming surfactant. The generated acid also may act as a breaker for a viscosified treatment fluid, such as a fracturing fluid.

Any particulate suitable for use in as proppants in conjunction with fracturing applications is suitable for use as particulates in these embodiments of the methods of the invention. For instance, natural sand, quartz sand, particulate garnet, glass, ground walnut hulls, polymeric pellets, bauxite, ceramics, fibers, or the like are all suitable. Suitable sizes range from about 4 to about 100 U.S. mesh, in certain preferred embodiments, the sizes may range from about 10 to about 70 U.S. mesh.

The orthoester compositions of the invention may be coated onto a particulate material by any means known in the art. For instance, in one embodiment, the particulates may be coated with an orthoester composition "on-the-fly." The term "on-the-fly" is used herein to refer to an instance where one flowing stream is continuously introduced into another flowing stream so that the streams are combined and mixed while continuing to flow as a single stream as part of an ongoing treatment. Such mixing can also be described as "real-time" mixing. Batch or partial batch mixing processes may also be suitable. The coated particulate as described herein may be used as proppant particles in fracturing operations or as any other particulate employed in subterranean operations that may be placed substantially adjacent to a foam comprising an acid reactive component. Particulates may include but are not limited to proppants, encapsulated chemicals, encapsulated breakers, encapsulated oxidizers, encapsulated enzymes, encapsulated scale inhibitors, solid scale inhibitors, poly(lactic acid), mixtures thereof and the like.

Where the orthoester composition is a relatively solid material at ambient temperatures, it may be advantageous to mix the orthoester composition with a solvent to facilitate the coating of the orthoester composition onto the particulates. A variety of solvents known in the art may be suitable. Some such solvents include, but are not limited to, acetone, propylene carbonate, dipropylene glycol methyl ether, methylene chloride, isopropyl alcohol, or combinations thereof.

In some embodiments of the invention, the particulates are coated with from about 0.1% to about 20% orthoester composition by weight of the particulates, more preferably from about 0.5% to about 10% orthoester composition by weight of the particulates, and most preferably from about 1% to about 8% orthoester composition by weight of the particulate material.

In some embodiments, 100% of the particulates are coated with an orthoester composition of the invention; in other embodiments, only a portion of the particulates may be coated. Where less than 100% of the particulates are coated with an orthoester composition of the invention, it may be desirable to use a higher concentration of orthoester composition relative to that portion of the particulates to be coated. It is within the ability of one skilled in the art with the benefit of this disclosure to determine the amount of orthoester composition that will be necessary to sufficiently alter the surfactant.

In a fracturing operation, the proppant pack formed inside a fracture from at least some of the coated particulates of the invention may be formed using any technique known in the art. In one technique, proppant particulates comprising at least some coated particulates of the invention are slurried into the foamed fracturing fluid and pumped into a subterranean formation at a pressure sufficient to create or enhance a fracture in the formation. At least a portion of those particulates is then placed in a fracture and forms a proppant pack substantially adjacent to the walls of the fracture. Once the proppant pack is substantially formed, the orthoester composition produces an acid that at least partially degrades the filter cake on the surfaces of the fracture. More disclosure on orthoesters can be found in U.S. application Ser. No. 10/785,300, filed Feb. 24, 2004 by inventors Keith A. Frost, Gary P. Funkhouser, and Brad L. Todd; U.S. Ser. No. 10/641,242, filed Aug. 14, 2003 by inventors Bradley L. Todd and Ronald J. Powell; U.S. application Ser. No. 10/752,752, filed Jan. 7, 2004 by inventors Keith A. Frost, Gary P. Funkhouser, Bessie Nita Q. Citrowaske, and Brad L. Todd, all of which are herein incorporated by reference in their entirety.

The orthoester can be introduced into the formation prior to, concurrent with, or subsequent to introduction of the foamed fracturing fluid to achieve the desired change in pH and resultant defoaming. Preferably, the orthoester is introduced concurrently with the foamed fracturing fluid. The required amount of acid generated by the orthoester to defoam the foamed fracturing fluid depends on the amount of surfactant that is used to foam the fracturing fluid. The amount of surfactant that is used to foam the fracturing fluid, in turn, depends on the required degree of foam stability. The degree of foam stability is measured by the half-life of the foam.

The surfactant enables the fracturing fluid to be foamed with a gas at a first pH and defoamed at a second pH. The foamed fracturing fluid can be foamed and defoamed by simply changing its pH.

One surfactant that can be used in the fracturing fluid is a tertiary alkyl amine ethoxylate. Tertiary alkyl amine ethoxylate can be changed from a foaming surfactant (i.e., a surfactant that facilitates foaming of the fracturing fluid) to a nonfoaming surfactant (i.e., a surfactant that does not facilitate foaming of the fracturing fluid) by the addition of a hydrogen ion. It can then be changed back to a foaming surfactant by the addition of a hydroxide ion. The following formula represents the ability of the tertiary alkyl amine ethoxylate to be changed from a foaming surfactant to a nonfoaming surfactant:

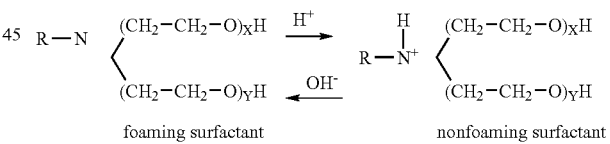

wherein R is an alkyl group or groups having from about 12 to about 14 carbon atoms; and wherein X and Y are each independently at least one. Preferably, the sum of X and Y varies from about 2 to about 15, and more preferably from about 10 to about 15. Triton RW-100 surfactant (X and Y=10) and Triton RW-150 surfactant (X and Y=15) are examples of tertiary alkyl amine ethoxylate that can be purchased from Dow Chemical Company.

In another embodiment, the foamed fracturing fluid comprises an amphoteric surfactant and an anionic surfactant. The relative amounts of the amphoteric surfactant and the ionic surfactant in the surfactant mixture are from about 32 to about 45% by weight of the surfactant mixture and from about 55 to about 68% by weight of the surfactant mixture, respectively. As used throughout the specification, "%" represents "percent." The amphoteric surfactant can comprise lauryl amine oxide, a mixture of laurylamine oxide and myristylamine oxide (laurylamine/myristylamine oxide), cocoamine oxide, lauryl betaine, oleyl betaine, cocoamido propyl betaine, any mixture thereof in any proportion, with the laurylamine/myristylamine oxide being preferred. Such amine oxides are generally represented by the formula:

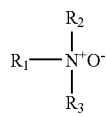

where $R_1$ is $C_{12}$ (lauryl), $C_{12-14}$ (lauryl/myristyl), or $C_{8-12}$ (coca), and where $R_2$ and $R_3$ can independently be a hydrogen, an alkyl group, or aryl group. Preferably, $R_2$ and $R_3$ are independently a methyl group. Further, such betaines are generally represented by the formula:

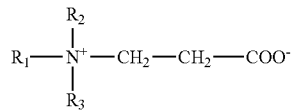

where $R_1$ is $C_{12}$ (lauryl) or $C_{18}$ (oleyl) and $R_2$ and $R_3$ can independently be a hydrogen, an alkyl group, or an aryl group. Such amine oxides and betaines are commercially available from Chemron, a Lubrizol Co., of Paso Robles, Calif. The ionic surfactant can comprise $C_{4-12}$ alcoholether sulfate, α-olefin sulfonate, sulfonated $C_{15}$ alcohol substituted with from about 12 to about 40 moles of ethylene oxide, sodium lauryl-2-sulfate, sodium lauryl-3-sulfate, and any mixtures thereof in any proportion, e.g., $C_{4-12}$ alcohol ether sulfate containing 1.5 to 3 moles of ethylene oxide combined with the α-olefin sulfonate ($C_{2-14}[OH]SO_3Na^+$), with the alcohol ether sulfate and the α-olefin sulfonate being preferred.

The first pH at which the foamed fracturing fluid comprising the amphoteric surfactant and the ionic surfactant foams is in the range of at least about 11. When the foamed fracturing fluid is foamed, its pH is initially in the first pH range. Thus, it can be foamed and conveyed to a subterranean formation via a wellbore.

After the foamed fracturing fluid passes downhole, the acid generated from the orthoester is "released" and lowers the pH of the foamed fracturing fluid within the second pH range, resulting in a nonfoaming surfactant. The second pH, which is the pH at which the foamed fracturing fluid forms a nonfoaming surfactant, is less than about 8.

The amount of surfactant present in the water preferably ranges from about 0.1% to about 1.0% by volume of the liquid phase which is typically water. The particular amount of the surfactant used in the fracturing fluid depends on the required degree of foam stability, which is directly proportional to the half-life of the foam.

The particular pH at which the fracturing fluid can be foamed by the addition of a gas and the particular pH at which it forms a nonfoaming surfactant depends on the nature of the surfactant. In an embodiment, the pH of the foamed fracturing fluid when it is formed (first pH) and the pH of the foamed fracturing fluid when it is defoamed (second pH) are each basic. In one aspect of this embodiment, the first pH is at least about 11 and the second pH is less than about 8.

In an embodiment, the first pH at which the fracturing fluid is formed is in the range of at least about 11 with a half-life of the fracturing fluid at the first pH greater than about 15 minutes.

The second pH at which the fracturing fluid defoams is in the range of less than about 8 with a half-life of the fracturing fluid at the second pH less than about 2 minutes.

Without being limited by theory, it is believed that the surfactant facilitates the formation of foam when the fracturing fluid is at a first pH by reducing the surface tension between the gas and the liquid therein, thus promoting and stabilizing the gas-liquid dispersion. On the other hand, the surfactant facilitates reduction of the foam when the fluid is changed to a second pH. Further, it is believed that, at the second pH, the fracturing fluid does not have the ability to reduce the surface tension between the gas and the liquid.

In addition, the fracturing fluid can contain a gelling agent, also known as a viscosifying agent. As used herein, "gelling agent" refers to a material capable of forming the fracturing fluid into a gel, thereby increasing its viscosity. The amount of the gelling agent present in the fracturing fluid can range from about 0.125 to about 0.375% by weight of the water. Examples of suitable gelling agents include, but are not limited to, natural or derivatized polysaccharides that are soluble, dispersible, or swellable in an aqueous liquid, modified celluloses and derivatives thereof, and biopolymers and derivatives thereof. Examples of polysaccharides include, but are not limited to: galactomannan gums such as guar gum, locust bean gum, gum ghatti, gum karaya, tamarind gum, and tragacanth gum; depolymerized gums such as depolymerized guar gum; modified gums such as carboxyalkyl derivatives, e.g., carboxymethylguar, and hydroxyalkyl derivatives, e.g., hydroxyethyl guar, hydroxypropylguar, and carboxymethyl guar; and doubly derivatized gums such as hydroxypropyl carboxymethyl guar and hydroxyethyl carboxymethyl guar. Examples of water-soluble cellulose ethers include, but are not limited to, methylcellulose, carboxymethyl cellulose, hydroxyethyl cellulose, and hydroxyethyl carboxymethyl cellulose. Examples of biopolymers include, but are not limited to, xanthan gum, modified xanthan gum, scleroglucan, diutan, and welan gum.

Examples of other suitable gelling agents include, but are not limited to, water dispersible hydrophilic organic polymers having molecular weights ranging from about 100,000 to about 10,000,000 such as polyacrylamide and polymethacrylamide, wherein about 5% to about 7.5% are hydrolyzed to carboxyl groups and a copolymer of about 5% to about 70% by weight acrylic acid or methacrylic acid copolymerized with acrylamide or methacrylamide.

Examples of additional suitable gelling agents include, but are not limited to, water soluble polymers such as a terpolymer of an ethylenically unsaturated polar monomer, an ethylenically unsaturated ester, and a monomer selected from acrylamido-2-methylpropane sulfonic (AMPS) acid or N-vinylpyrrolidone; and a terpolymer of an ethylenically unsaturated polar monomer, an ethylenically unsaturated ester, AMPS acid, and N-vinylpyrrolidone. Other suitable gelling agents are polymerizable water soluble monomers, such as acrylic acid, methacrylic acid, acrylamide, and methacrylamide.

Preferred gelling agents include depolymerized guar gum, guar gum, locust bean gum, hydroxyethyl guar, hydroxypropyl guar, hydroxyethyl carboxymethyl guar, hydroxpropyl carboxymethyl guar, carboxymethyl guar, hydroxyethyl cellulose, hydroxyethyl carboxymethyl cellulose, carboxymethyl cellulose, methyl cellulose, xanthan gum, diutan, scleroglucan, and welan gum. In an embodiment, the gelling agent is depolymerized guar gum prepared by subjecting hydroxypropyl guar to oxidative degradation with hydrogen peroxide. In an embodiment, the depolymerized guar gum prepared as a solution where the activity of the polymer ranges from 11-12%. A 2% solution by volume of the depolymerized guar gum in distilled water will yield a viscosity of from about 8 to 25 cp measured by a Fann 35 viscometer equipped with a ⅕ spring.

The amount of gelling agent present in the fracturing fluid is preferably in the range of from about 10 to about 30 pounds (lbs)/1,000 gallons (gal) of fracturing fluid. Additional disclosure regarding the foregoing gelling agents can be found in U.S. Pat. No. 6,454,008 assigned to Halliburton that issued on Sep. 24, 2002, which is incorporated by reference herein in its entirety.

The fracturing fluid can be foamed by adding gas to the fracturing fluid while pumping it into a wellbore that penetrates the subterranean formation. The gas can be, for example, nitrogen. Other gasses such as carbon dioxide are also contemplated for use in the invention.

A bacteriacide can also be added to the fracturing fluid for the purpose of preventing or alleviating a bacterial attack. Examples of suitable bacteriacides include, but are not limited to, glutaric aldehyde and hexahydro-1,3,6-tris(hydroxyethyl)-S-triazne. The concentration of the bactericide added to the fracturing fluid preferably ranges from about 0.1 to about 0.15 gallon of bactericide per 1,000 gallons of the water.

The foamed fracturing fluid can also comprise a proppant for preventing fractures formed in the subterranean formation from closing. Examples of suitable proppants include, but are not limited to, resin coated or uncoated sand, sintered bauxite, ceramic materials, and glass beads. The proppant is preferably present in the fracturing fluid in an amount ranging from about 0.1 to about 33 pounds/gallon based on the liquid volume of the fluid, alternatively from about 5 to about 25 pounds/gallon based on the liquid volume of the fluid. It is also contemplated that the proppant can be introduced into the wellbore before or after the foamed fracturing fluid has been introduced into the wellbore.

One skilled in the art will recognize that the fracturing fluid described above can be formed by combining its components, including the water, the surfactant, the gelling agent, and the proppant in varying orders based upon the fluid properties desired, equipment available, desired treatment results, and the like. By way of example, the water can be combined with the gelling agent, followed by adding the surfactant to the resulting mixture. The proppant can then be added to the fracturing fluid before foaming the fluid.

In one embodiment, the invention provides for a method of fracturing a subterranean formation, comprising forming a foamed fracturing fluid comprising water, an orthoester, a surfactant comprising a tertiary alkyl amine ethoxylate generally represented by the following formula as indicated above, wherein R is an alkyl group or aryl group, and wherein X and Y are each independently at least one; and a gas. The method also comprises introducing the foamed fracturing fluid into a subterranean formation at a pressure sufficient to create a fracture in the subterranean formation.

The fracturing fluid can be a fracturing fluid that once foamed, the foamed fracturing fluid is pumped to the subterranean formation at a pump pressure sufficient to exceed the fracturing gradient and fracture the subterranean formation. The fracturing fluid can be pumped downhole for a period of time sufficient to achieve a desired amount of fracture geometry in the subterranean formation. A proppant can be combined with the fracturing fluid before pumping it downhole such that the proppant becomes suspended in the foam.

Also within the scope of the invention is an orthoester that is introduced into the subterranean formation prior to or subsequent to introducing the foamed fracturing fluid. In these embodiments, the orthoester need not be introduced along with the foamed fracturing fluid. The appropriate orthoester to be used in each case will depend on the timing of the release of acid from the orthoester.

The invention also provides a method of making a foamed fracturing fluid for use in a subterranean formation penetrated by a well, the foamed fracturing fluid comprising: (a) foaming a fracturing fluid, wherein the foamed fracturing fluid comprises water, an orthoester, a surfactant as described above; and (b) introducing the foamed fracturing fluid into the subterranean formation.

The foam comes into contact with the acid generated from the orthoester that causes a lowering of the pH of the fracturing fluid. This lowering in the pH of the fracturing fluid in turn causes viscosity to be reduced, resulting in the dissipation of the foam in the fracturing fluid. Due to the static condition of the defoamed fracturing fluid and to gravity, the proppant begins settling such that it becomes deposited in the fractures of the subterranean formation. In turn, the proppant holds the fractures open during the subsequent production of oil, water, or natural gas from the formation.

It should be understood by those skilled in the art that the fracturing fluid can be re-foamed and recycled to the same or a different subterranean formation to fracture that formation as described previously.

After careful consideration of the specific and exemplary embodiments of the invention described herein, a person of ordinary skill in the art will appreciate that certain modifications, substitutions and other changes can be made without substantially deviating from the principles of the invention. The detailed description is illustrative, the spirit and scope of the invention being limited only by the appended Claims.

What is claimed is:

1. A method of fracturing a subterranean formation, comprising the steps of:
   a) forming a foamed fracturing fluid comprising:
      i) water;
      ii) an orthoester;
      iii) a surfactant comprising a tertiary alkyl amine ethoxylate generally represented by the following formula:

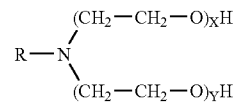

wherein R is an alkyl group or aryl group, and wherein X and Y are each independently at least one; and
      iv) a gas; and
   b) introducing the foamed fracturing fluid into a subterranean formation at a pressure sufficient to create a fracture in the subterranean formation.

2. The method according to claim 1, wherein the foamed fracturing fluid has a first pH of at least 11.

3. The method according to claim 1, wherein the orthoester decreases the pH of the foamed fracturing fluid to less than about 8.

4. The method according to claim 1, wherein the orthoester decreases the pH of the foamed fracturing fluid to sufficiently convert the foaming surfactant to a nonfoaming surfactant, whereby the foamed fracturing fluid substantially defoams.

5. The method according to claim 1, wherein the orthoester has the general formula RC(OR')(OR")(OR'"), wherein R is a hydrogen, an alkyl group, or an aryl group, wherein R', R", and R'" are each an alkyl group or an aryl group but not hydrogen, and wherein R', R", and R'" may or may not be the same group.

6. The method according to claim 5, wherein any one or more of R, R', R", and R'" comprises a heteroatom.

7. The method according to claim 6, wherein the heteroatom is nitrogen or oxygen.

8. The method according to claim 1, wherein the orthoester comprises an orthoacetate, an orthoformate, or an orthopropionate.

9. The method according to claim 1, wherein the orthoester comprises an orthoester of a polyfunctional alcohol.

10. The method according to claim 1, wherein the orthoester comprises a poly(orthoester).

11. The method according to claim 1, wherein at least a portion of the orthoester is coated or impregnated onto particulates to form coated particulates or impregnated particulates.

12. The method according to claim 1, wherein the sum of X and Y is in the range of about 10 to about 15.

13. The fluid according to claim 12, wherein the amphoteric surfactant is selected from the group consisting of lauryl amine oxide, a mixture of laurylamine oxide and myristylamine oxide (laurylamine/myristylamine oxide), cocoamine oxide, lauryl betaine, oleyl betaine, cocoamido propyl betaine, and any mixtures thereof in any proportion.

14. The fluid according to claim 12, wherein the ionic surfactant is selected from the group consisting of $C_{4-12}$ alcoholether sulfate, α-olefin sulfonate, sulfonated $C_{15}$ alcohol substituted with from about 12 to about 40 moles of ethylene oxide, sodium lauryl-2-sulfate, sodium lauryl-3-sulfate, and any mixtures thereof in any proportion.

15. The method according to claim 1, wherein the foamed fracturing fluid further comprises an amphoteric surfactant and an anionic surfactant.

* * * * *